Sept. 2, 1930.     J. T. SCULLY     1,774,904
CONTAINER FOR POWDERS
Filed Dec. 9, 1927
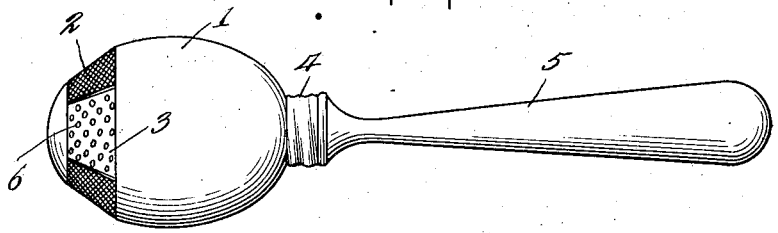
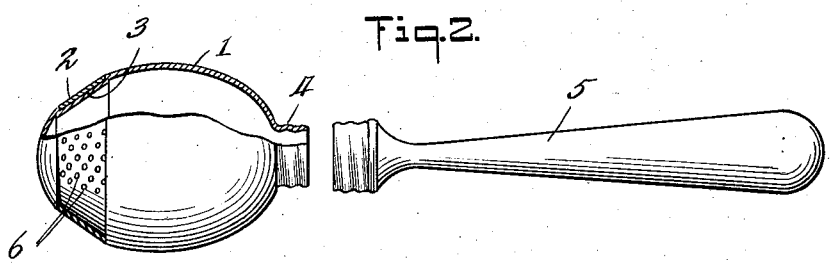
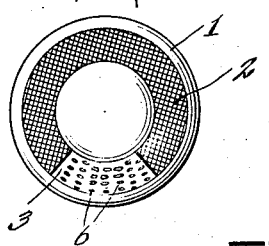   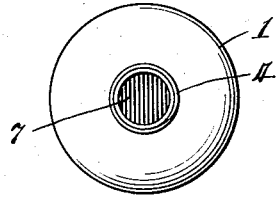
INVENTOR
John J. Scully Patented Sept. 2, 1930

1,774,904

UNITED STATES PATENT OFFICE

JOHN T. SCULLY, OF NEW YORK, N. Y.

CONTAINER FOR POWDERS

Application filed December 9, 1927. Serial No. 238,856.

This invention relates to improvements in containers for talc and other powders for personal body use and has especial reference to containers which have incorporated therein means for dispensing the powder, an object of the invention being to provide a container for powder for personal body use which will enable the user to reach with greater facility by means of a handle the back parts of the body.

Another object of this invention is to provide a personal use powder container which will present a graceful appearance and be of ornamental design.

A further object of the invention is the provision of a container which is easily refilled.

A further object of the invention is the provision of means for covering and uncovering perforations of the dispensing means of a powder container which enables the user to perform the operation with a minimum of ease and without danger of damaging finger nails.

With the above and other objects in view, the invention further includes the following novel features and details of construction, to be hereinafter more fully described, illustrated in the accompanying drawings and pointed out in the appended claims.

In the drawings:

Figure 1 is a side view of the invention.

Figure 2 is a side view of the invention showing the dispensing perforations and a separable handle.

Figure 3 is a front end view of the invention.

Figure 4 is a rear end view of the body of the container.

Figure 5 is a perspective view illustrating the means for covering and uncovering the dispensing perforations.

Referring to the drawings in detail wherein like characters of reference denote corresponding parts, the reference character 1 indicates the hollow body of the powder container and 5 denotes the handle therefor. The body 1 and the handle 5 may be of any suitable material. A grooved channel path 3 with perforations 6 extending through the channel path wall is formed in the body, and a band section 2 with shape complementary to the channel path 3 partially encircles the path 3. This band secton 2 has its outer surface roughened to facilitate rotating same. A removable handle 5 engages threads 4 provided on the body 1. An opening 7 is provided in the body 1 through which the body 1 may be refilled when the handle 5 is detached. The perforations 6 in the channel path 3 may be closed off by sufficiently rotating the band section 2.

The body 1 may be of a variety of shapes and forms, but I prefer to have one end of the body of less circumference than the greatest circumference of the body, and I prefer to place the grooved channel path with perforations near the end of the body. Also, I prefer to have the band section 2 project slightly from the body in order to facilitate grasping it.

While I show a detachable handle 5 I wish it to be understood that the handle may be fixed permanently to the body 1 as in instances where talc or other personal body powder may be marketed in this container instead of in the ordinary cans now in use. The refillable feature of the container, as shown in the drawings, has utility in permitting a container to be made of more valuable materials for permanent use at home, in beauty parlors and the like.

Although in the drawings I illustrate an oval shaped body 1 as my preference, I desire to be not limited thereto as I may prefer to have the body 1 spherical or drum shaped.

The invention is susceptible of various changes in its form, proportions and minor details of construction and the right is herein reserved to make such changes as properly fall within the scope of the appended claims.

Having described the invention what I claim is:

1. A powder container including a container body of substantially oval shape, a hollow chamber in said body, a circumferential channel having one side edge of smaller circumference than the other edge formed in the body, perforations in said channel, a rotary cut-off comprising a section of a band having one circumferential side edge of less circumference than its opposite edge carried in said channel and cooperable with said perforations in the channel whereby rotary movement of said band section opens up or cuts off said perforations, an opening at one end of said body leading from said chamber whereby said body may be filled and a closure cap to close or open said opening.

2. A powder container including a container body of substantially oval shape, a hollow chamber in said body, a circumferential channel having one side edge of smaller circumference than the other edge formed in the body, perforations in said channel, a rotary cut-off comprising a section of a band having one circumferential side edge of less circumference than its opposite edge carried in said channel and cooperable with said perforations in the channel whereby rotary movement of said band section opens up or cuts off said perforations, and an opening at one end of said body leading from said chamber whereby said body may be filled, and a closure cap to close or open said opening, said closure cap being provided with an integral extension adapted to serve as a handle for readily manipulating said cap, and when in closed position, for manipulating the said container as a whole.

In testimony whereof I affix my signature.

JOHN T. SCULLY.